United States Patent [19]

Connolly

[11] Patent Number: 4,875,653
[45] Date of Patent: Oct. 24, 1989

[54] SUPPORT SYSTEMS AND APPARATUS FOR SUSPENDING AND RESUSPENDING ARTICLES AT SELECTED HEIGHT POSITIONS

[76] Inventor: Donald P. Connolly, 4590 Kensington Rd., Milford, Mich. 48042

[21] Appl. No.: 260,014

[22] Filed: Oct. 19, 1988

[51] Int. Cl.⁴ .............................................. B66D 1/36
[52] U.S. Cl. ........................................ 248/332; 47/67; 24/128
[58] Field of Search ............... 248/493, 317, 320, 322, 248/318, 323, 327, 328, 329, 332, 339; 24/114.5, 129 R, 129 D, 115 H, 230.5 TP, 230.5 AD, 230.5 R, 128; 47/67

[56] References Cited

U.S. PATENT DOCUMENTS

| | | | |
|---|---|---|---|
| 641,038 | 1/1900 | Reeves | 24/129 R |
| 711,570 | 10/1902 | Hover . | |
| 1,057,484 | 4/1913 | Huber | 248/493 |
| 1,272,272 | 7/1918 | Kell | 24/129 R |
| 1,472,840 | 11/1923 | Humphreys | 24/129 R |
| 1,531,746 | 3/1925 | Fort | 24/129 R |
| 1,633,344 | 6/1927 | Moran | 248/328 |
| 1,648,933 | 11/1927 | Boyce . | |
| 1,691,183 | 12/1928 | Forse, Jr. . | |
| 2,814,457 | 11/1957 | Phelan | 248/328 |
| 2,814,861 | 12/1957 | O'Connell | 248/339 |
| 3,002,780 | 10/1961 | Eggeman | 24/129 R |
| 3,042,337 | 7/1962 | Dinneen | 242/85.1 |
| 3,042,355 | 7/1962 | Stevens | 248/328 |
| 3,050,286 | 8/1962 | Seamans et al. | 254/192 |
| 3,131,452 | 5/1964 | Marino | 24/230.5 TP |
| 3,378,233 | 4/1968 | Ferdig | 254/192 |
| 3,460,779 | 8/1969 | Peasley | 242/85.1 |
| 3,636,594 | 1/1972 | Faivre | 24/73 |
| 3,944,186 | 3/1976 | Einhorn et al. | 254/191 |
| 4,057,211 | 11/1977 | Moore | 248/332 |
| 4,079,909 | 3/1978 | Einhorn | 248/318 |
| 4,109,415 | 8/1978 | Hall | 47/67 |
| 4,187,996 | 2/1980 | Ehrlich | 47/67 |
| 4,220,306 | 9/1980 | Cueto | 248/328 |
| 4,245,839 | 1/1981 | Trent | 272/116 |
| 4,556,184 | 12/1985 | O'Sullivan | 248/330 |
| 4,669,693 | 6/1987 | Kagan | 248/318 |

FOREIGN PATENT DOCUMENTS

| | | | |
|---|---|---|---|
| 2433742 | 2/1975 | Fed. Rep. of Germany | 24/129 R |
| 2045304 | 10/1980 | United Kingdom | 24/129 R |

Primary Examiner—Ramon O. Ramirez
Assistant Examiner—Robert A. Olson
Attorney, Agent, or Firm—Krass & Young

[57] ABSTRACT

The invention concerns an article suspension system and is provided for raising, lowering and suspending an article (such as display materials, botanical specimens, electrical, video or electronic gear, and the like) on a cord, e.g. overhead or across open spaces, at selected positions of static and dynamic suspension such as display or monitoring positions or service and maintenance positions. The invention includes novel article hook means, locking handle means, and cord lock means for suspension from one or more pulley supports.

18 Claims, 3 Drawing Sheets

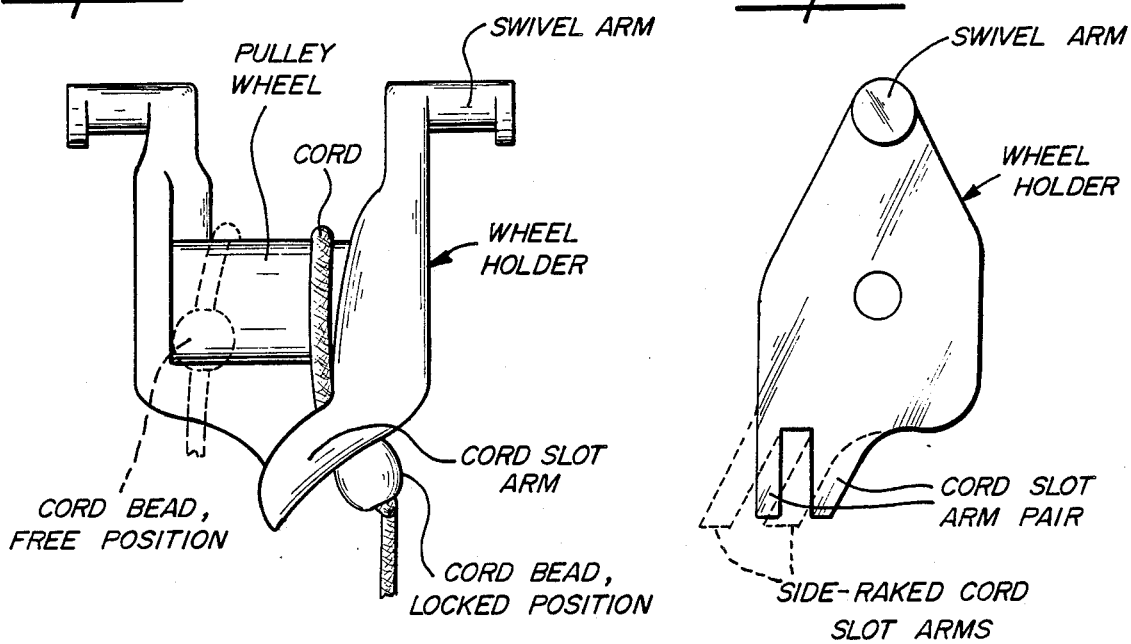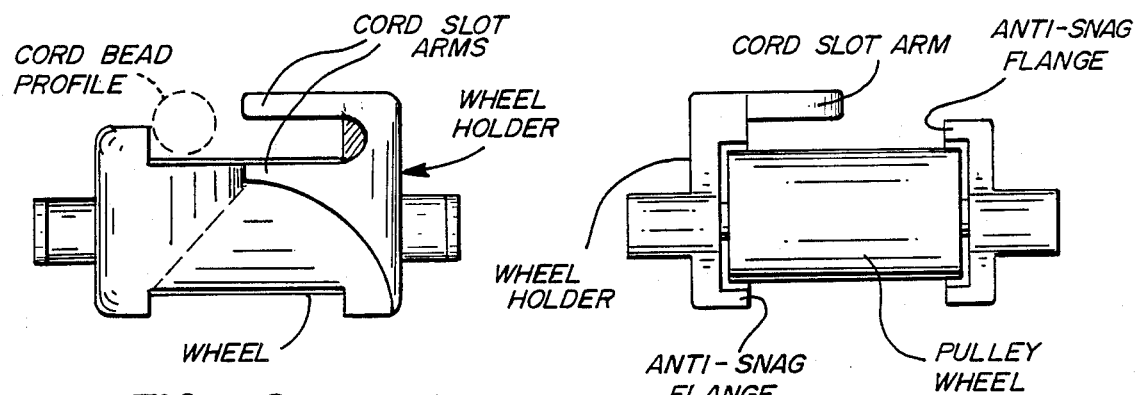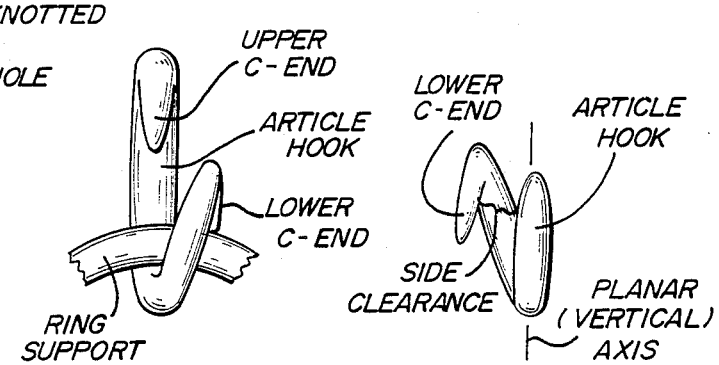

SUPPORT SYSTEMS AND APPARATUS FOR SUSPENDING AND RESUSPENDING ARTICLES AT SELECTED HEIGHT POSITIONS

FIELD OF THE INVENTION

This invention relates to support systems and apparatus for reliably suspending and resuspending articles such as display materials, botanical specimens, electrical, video or electronic gear, and the like, in static or stationary position at any one of different heights as selected from time to time.

BACKGROUND OF THE INVENTION

A wide variety of systems and apparatus is available for suspending line-supported articles from a fixed support surface such as a ceiling, wall, mast, or the like. One such system is a locking pulley assembly described in U.S. Pat. No. 3,944,186. The assembly uses a pulley wheel support and a line or cord that for locking purposes is fed into a locking groove of the pulley wheel to immobilize the line at a desired position of static suspension. A difficulty with this system however is that after repeated use, the cord becomes compressed or worn to the point where it may slip in the locked position so that locking of the suspension is correspondingly insufficient.

It is therefore an object of the present invention to provide improved suspension systems and apparatus for the described purposes.

It is also an object to provide economical and cost efficient systems and apparatus of the kind described.

These and other objects, features and advantages of the invention will be seen from the following detailed description and the accompanying drawings.

SUMMARY AND DETAILED DESCRIPTION OF THE INVENTION

The invention concerns suspension systems and apparatus which enable elevated hanging and rehanging of articles at a choice of selected heights and also enable manual control and service maintenance by personnel located at a lower level such as floor level.

The invention in one preferred aspect in an article system concerns an article hook for raising, lowering and suspending an article on a cord at selected positions of static and dynamic suspension. The system includes a supporting pulley wheel and a cord having first and second opposed ends joining and extending between the hook and a handle and being adapted to be hung in a first position of static suspension over the top of the pulley wheel with one cord section reaching therebelow to an article suspended by the hook and with another cord section reaching therebelow in suspension to the handle by means of which handle the suspended article can be raised and lowered with respect to the pulley wheel.

The article hook has a generally planar C-shape terminating in operative position in vertically spaced apart upper and lower C-end portions. The lower C-end portion is adapted for hanging the article thereon and has lateral or spiral curvature outward to one side of the planar shape allowing lateral spacing therebetween sufficient to accommodate placement of the article onto and removal from said side of the hook.

Preferably, the distal end of the lower C-end portion has reverse curvature limiting clearance with respect to the vertical axis in the plane of the C-shape such that placement of the article onto and removal from the planar open face of the hook is disaccommodated. Preferably, the curvature at the distal end for reception of a surrounding ring or loop means is dimensioned and has clearance only for sidewise placement and removal from the distal end. The invention contemplates the combination of two or more such systems of the invention for suspending a single article therebetween, e.g., from opposite sides of a large open or atrium space, a space above water, or other space that ordinarily could not conveniently accommodate a single suspension system directly from above.

The invention in another preferred aspect, in an article suspension system concerns a cord lock for raising, lowering and suspending an article on a cord at selected positions of static and dynamic suspension. The system includes a pulley comprising a pulley wheel and a pulley holder, an article hook, a handle, and a cord joining and extending between said article hook and handle and being adapted to be hung in a first position of static suspension over the top of the pulley wheel with one cord section reaching therebelow to an article suspended by said hook and with another cord section reaching therebelow in suspension to the handle by means of which handle the suspended article can be raised and lowered with respect to the pulley wheel. The cord lock comprises slot means for said pulley of a width accommodating free passage of the cord length therethrough and at least one discontinuous enlargement in the diameter of the cord greater than the slot width. The enlargement of the cord is located at a selected position point in the length of the cord such that the enlargement can be reeled in or paid out over the top of the pulley wheel under control of said handle with the article being correspondingly raised or lowered in dynamic suspension from said first position of static suspension to a second position of static suspension in which said enlargement under control of said handle is placed in anchoring registry with said slot means thereby anchoring and holding the cord in static suspension at said second position.

The enlargement of the cord according to the invention can take any of various forms which are suitable. For example, it can be a simple knot in the cord such as a slip knot or the like. Also, it can be a bead or button with at least one aperture or axial channel therethrough through which the cord is threaded, preferably threaded so that the same does not slip on the cord length. Preferably, the bead or button enlargement has opposite faces in mutually open communication through at least three apertures or axial channels (See FIG. 5) and is threaded therethrough by the cord with snubbing at the opposite faces to prevent longitudinal slipping of the enlargement with respect to the cord. Preferably the cord may have more than one such enlargement preferably at evenly longitudinally spaced apart points, corresponding to the points along the length of the cord where it is desired to lock the cord in static suspension, i.e., at each position point thereof corresponding, for example, to a display or monitoring position or a maintenance, e.g., floor level, position.

The slot means or channel slot for passage therethrough of the cord length can take any suitable form and is preferably located as an integral part of the pulley holder. Preferably, the pulley holder includes downwardly depending arms defining said slot means for passage therethrough of the cord, the arms being spaced apart such that unwanted cord passage therethrough (having a tendency to lower the article on the cord), at the point of the cord enlargement is prevented.

Preferably, the cord lock is in combination with the above-described C-shape article hook where the lower C-end portion is adapted for hanging said article thereon and has lateral or spiral curvature outward to one side of its planar shape allowing lateral spacing therebetween sufficient to accommodate placement of the article onto and removal from and preferably only from the side of the hook, thus locking the article at a height for display and the like while minimizing the possibility of unintentional dislodgement of the article from suspension.

The invention in another preferred aspect, in an article suspension system, concerns a locking handle for raising, lowering and suspending an article at selected positions of static and dynamic suspension. The system includes a supporting pulley wheel and a first or article hook having a C-shape terminating in operative position in vertically spaced apart upper and lower C-end portions. The lower C-end portion is adapted for hanging said article thereon. Also included is a cord joining and extending between said first hook and the handle and being adapted to be hung in a first position of static suspension over the top of the pulley wheel with a first cord section reaching therebelow to an article suspended by the first hook and with a second cord section reaching therebelow in suspension to the handle by means of which handle the suspended article can be raised and lowered with respect to the pulley wheel. The locking handle has in operative position a unitary lower C-end portion comprising a second hook adapted to join in hooking relation with the upper C-end portion of said first hook such that the article can be placed in static suspension from said mutually joined first and second hooks. Preferably, the handle includes aperture means in the body handle for securing the cord therewith. Preferably, the handle includes opposed concave edges in the body portion configured in a reel shape adapted for reeling and storage of existing slack in the length of the suspension cord.

BRIEF DESCRIPTION OF THE DRAWINGS

The invention will be more fully understood by reference to the accompanying drawings in which:

FIGS. 6 and 7 are side and end elevational views of a pulley wheel holder and pulley according to a preferred embodiment;

FIGS. 8 and 9 are bottom and top views of the pulley wheel holder and pulley of FIGS. 6 and 7; and FIGS. 10a, 10b and 10c are side, open-end and top views respectively of a preferred embodiment of an article hook according to the invention.

Referring to the drawings, FIG. 1 shows an article suspended at a height on display. The article is hung on a first or article hook which in turn is secured at its upper end by a suitable line or cord (sometimes referred to herein simply as a cord). The cord is suspended from over the top of a supporting wheel and draped downward on the opposite side of the pulley wheel to a cord reel handle.

As seen in FIG. 3 and FIGS. 7 to 10, the pulley wheel holder includes parallel cord slot or claw arms offset to one underside of the holder defining a slot channel means therebetween. In one preferred embodiment shown in FIG. 7 in dotted outline, the cord slot arms are raked at an angle to the side of the wheel holder to facilitate locking and unlocking in those cases where the operator is standing under and to the side of the pulley instead of directly under the pulley. FIG. 3 shows the cord passed through the channel with an enlargement bead in the cord spaced away from the claw arms in a position where the operator by pulling the handle can raise the enlargement into locking engagement with the underside of the arms (FIG. 7) so that further upward movement of that segment of the cord is prevented. As is seen, the cord can be disengaged from the locked position by pulling sideways on the handle and freeing the cord from the slot channel and when necessary moving the cord further sideways on the pulley wheel to a free position (in dotted outline illustrated in FIGS. 6 and 7) where the cord and its enlargement can be passed up and reeled over and down from the pulley wheel top for hand-held control and lowering of the suspended article to the service or maintenance locked-in position illustrated in FIG. 2 where the article hook and the hand-held handle are now at the same level. For purposes of reeling the cord over the pulley wheel without snagging on the wheel ends, the wheel holder includes anti-snag flanges (FIG. 9) which serve to keep the cord line centrally spaced from the pulley wheel ends.

FIG. 4 shows in greater detail the manner of locking or hooking together of the article hook and the handle. As is seen, one end of the cord extends and is fastened to the upper C-end position of the article hook which in turn by its lower C-end portion is holding a ring attachment for the article to be serviced. The other end of the cord is attached to and its free length for convenience reeled around, the body of the handle. The handle has matching lower and upper C-end hook portions that are functionally interchangeable for hooking with the upper C-end portion of the article hook. The upper C-end portion of the handle serves a dual purpose so that when not used for hooking attachment provides a convenient axial centering channel for the cord as seen. Thus, the cord rim to the locking bead from the front face of the reel is purposely wrapped or taken around to the back face of the handle and is then threaded or placed again onto the front face of the centering hook as shown, thereby avoiding entanglement of the lines at the front face and confining the two respective upward cord runs to the axial line of the handle.

FIG. 5 shows a preferred embodiment of a cord enlargement or bead and the manner of threading the cord through three parallel channels or thread holes in the bead with snub-loops on opposite faces. Snubbing of the upper snub-loop serves to snub the cord run to the pulley so that the bead is prevented from sliding on the cord in that direction. Snubbing on the lower snub-loop serves to prevent the bead from sliding on the cord in the opposite direction. Each snub-loop can be pulled loose at its pull-loose point so that the position of the cord enlargement can conveniently be changed from time to time as required for different purposes.

FIG. 6 shows the cord and cord bead in a locked position with the bead held against the cord slot arms of the pulley wheel holder. FIG. 8 shows the result of releasing the cord bead from the locked position of FIG. 6 and moving it by sliding along the edge of the pulley wheel to the free position indicated in dotted outline so that it can be reeled up and over the pulley wheel by the weight of the suspended article (FIG. 1) under manual guidance with the handle.

FIGS. 10a, 10b and 10c show the article C-hook in detail. As seen in FIG. 10a, the C-opening of the hook is relatively narrow (partly because of the reverse curvature of the lower C-end extending near to the upper C-end) thus disaccommodating the placing of a ring or loop frontally into the opening in hooking relation or in removing the same (whether intentionally or otherwise) by way of the front opening, especially where the support point (as illustrated) for such a ring or loop is located below the distal ends of the upper and lower C-ends of the article hook. Accommodation of a ring support is seen in FIG. 10b, and from FIG. 10c it is seen that there is clearance for sideways placing of such a ring onto the hook and also removing it sideways, thus minimizing the possibility that the ring and its supported display article or the like will be unintentionally dislodged from its overhead support.

Figure 1:
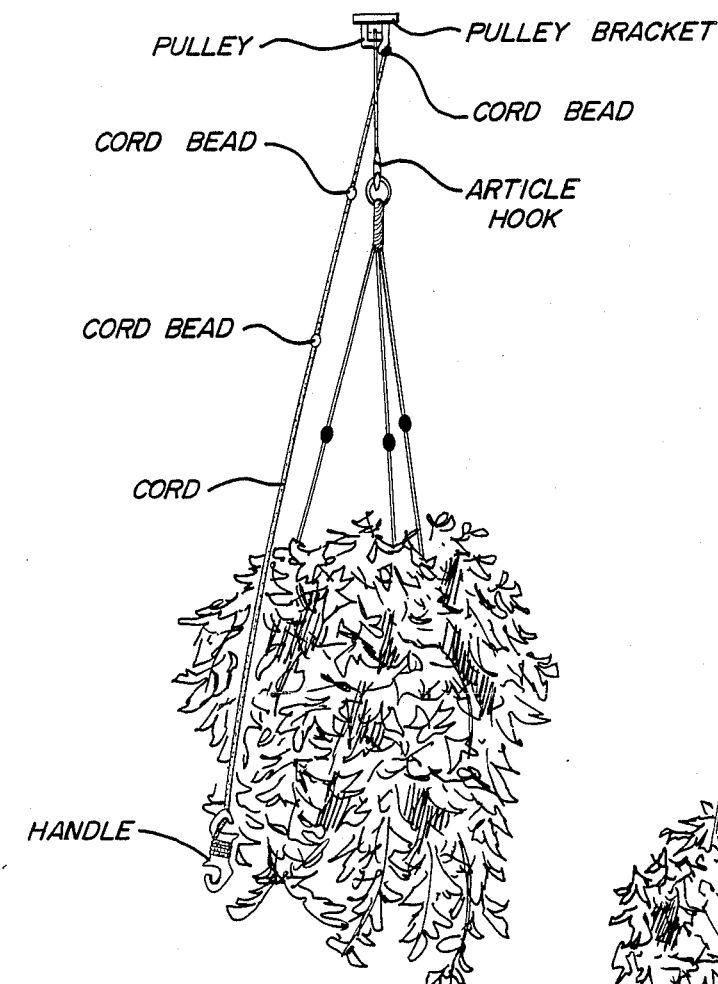
FIGS. 1 and 2 are views of preferred embodiments of an article suspension system of the invention in a regular display position and a maintenance position respectively.
Figure 2:
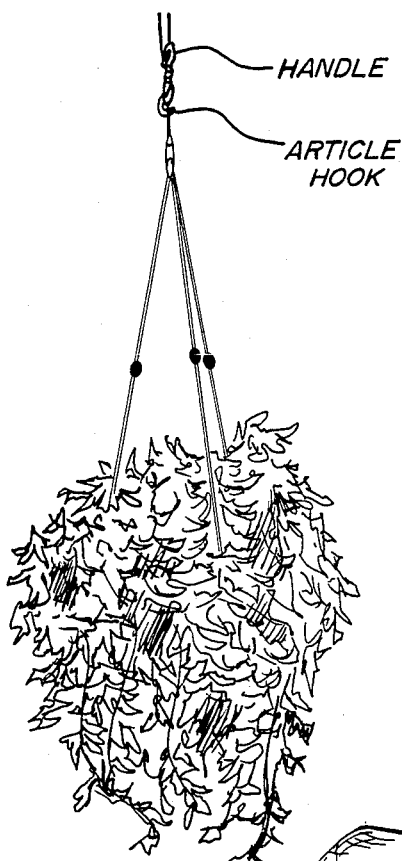
Figure 3:
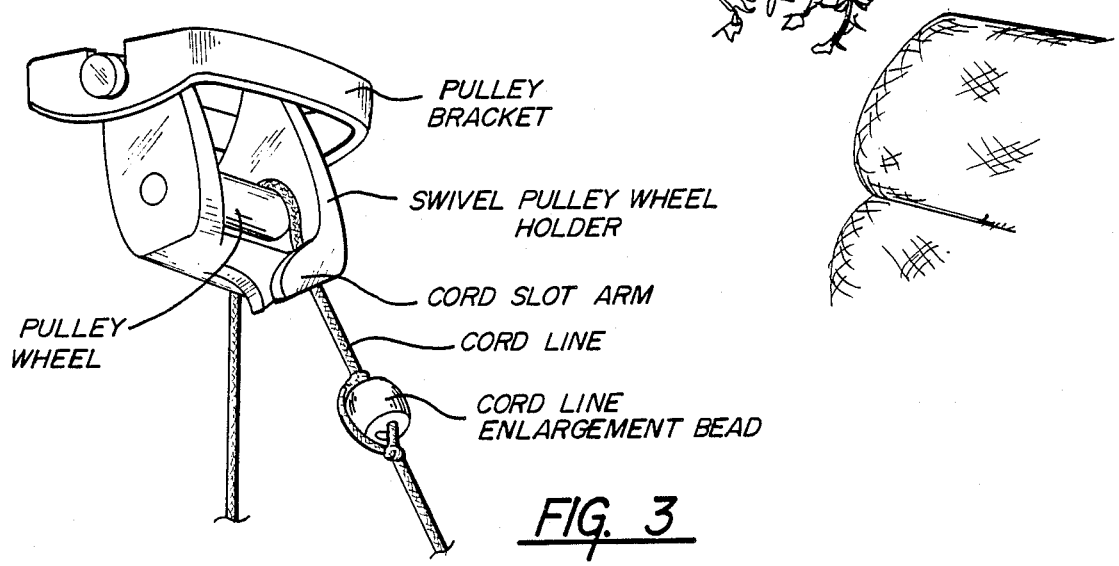
FIG. 3 is a view of a preferred embodiment showing a pulley bracket, swivel pulley wheel holder, and pulley wheel supporting a cord line and its cord line enlargement.
Figure 5:
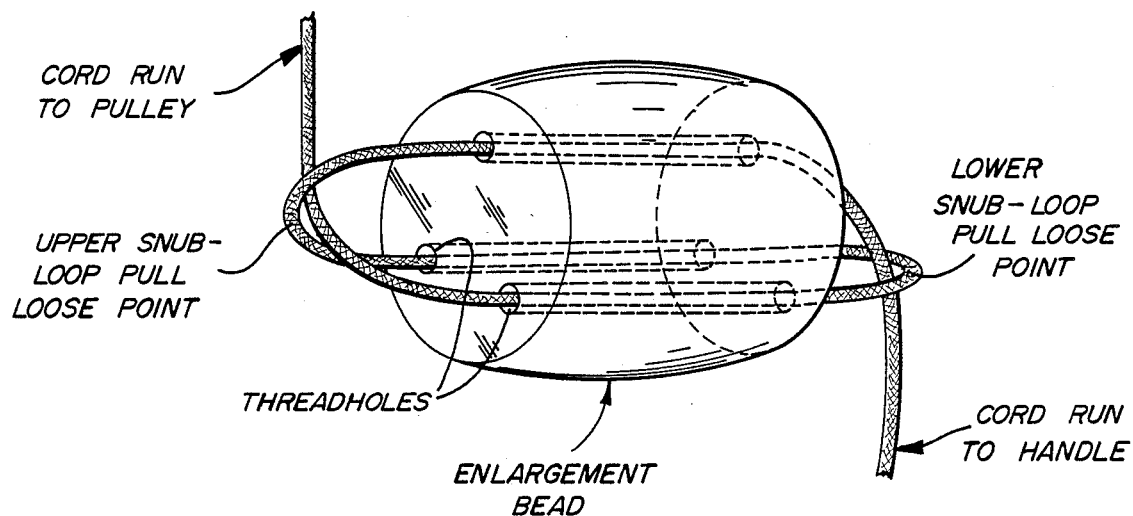
FIG. 5 is a view of a preferred embodiment of a cord enlargement bead or button according to the invention having releasable two-way cord snubbing.
Figure 4:
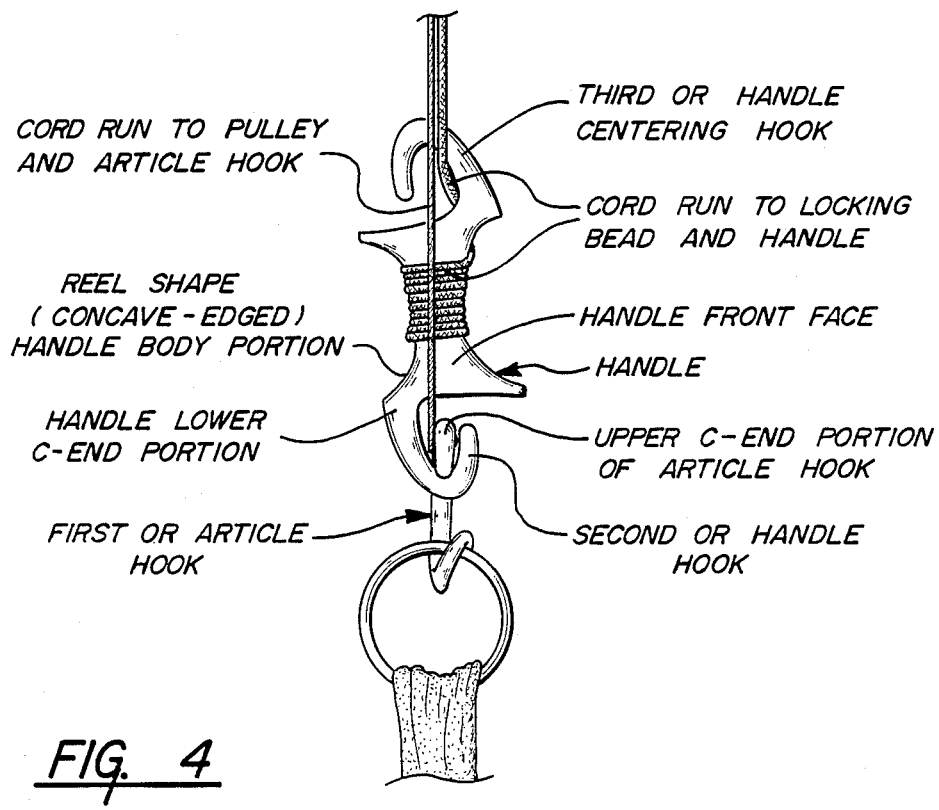
FIG. 4 is a view of a line-suspended locking handle in locking engagement with a line-suspended article hook.

The structural components of the article suspension system can be of durable plastic, metal alloy or other suitable material. The cord can be of nylon or other suitable high strength material, preferably a material or combination of materials, preferably woven or in a twist-free composite. The handle preferably can be made in one rigid piece of flat sheet-stock plastic.

What is desired to claim as my exclusive property in the invention, as described, is the following.

I claim:

1. In an article suspension system, an article hook for raising, lowering and suspending an article on a cord at selected positions of static and dynamic suspension, said system including a pulley comprising a pulley wheel and a pulley holder, and a cord having first and second opposed ends joining and extending between the hook and a handle and being adapted to be hung in a first position of static suspension over the top of the pulley with one cord section reaching therebelow to the article hook for holding an article suspended by the hook and with another cord section reaching therebelow in suspension to the handle by means of which handle the suspended article can be raised and lowered with respect to the pulley wheel, said article hook having a generally planar C-shape terminating in vertically spaced apart upper and lower C-end hook portions, said lower C-end hook portion being adapted for hanging said article thereon, said handle comprising a handle hook and said upper C-end article hook portion being configured as a proximal hook attached to the handle hook in depending hooking relation therewith for the purpose of maintaining an article in static suspension.

2. A hook according to claim 1 wherein the distal end of the lower C-end portion has reverse curvature limiting clearance with respect to the vertical axis in the plane of the C-shape such that placement of the article into and removal from the planar open face of the hook is disaccommodated.

3. A hook according to claim 2 having curvature at said distal end for ring or loop means dimensioned only for sidewise placement and removal from the distal end.

4. An article suspension system according to claim 1, where the pulley holder is swivel mounted in a pulley bracket.

5. An article suspension system according to claim 1, where the pulley holder includes anti-snag flanges closely adjacent to the pulley wheel ends such as to keep the cord centrally spaced from said wheel ends.

6. In an article suspension system, a cord lock for raising, lowering and suspending an article on a cord at selected positions of static and dynamic suspension, said system including a pulley comprising a pulley wheel and a pulley holder, an article hook, a handle, and a cord joining and extending between said article hook and handle and being adapted to be hung in a first position of static suspension over the top of the pulley wheel with one cord section reaching therebelow to an article suspended by said article hook and with another cord section reaching therebelow in suspension to the handle by means of which handle the suspended article can be raised and lowered with respect to the pulley wheel, said cord lock comprising slot means for said pulley of a width accommodating free passage of the cord length therethrough and at least one discontinuous bead or button enlargement in the diameter of the cord greater than the slot width, said enlargements being reelable and located at a selected position point in the length of the cord such that the enlargement can be reeled in or paid out over the top of the pulley wheel under control of said handle with the article being correspondingly raised or lowered in dynamic suspension from said first position of static suspension to a second position of static suspension in which said enlargement under control of said handle is placed in anchoring registry which said slot means thereby anchoring and holding the cord in static suspension at said second position, each such bead or button enlargement having opposite faces in open communication through at least three apertures and being threaded therethrough by the cord with snubbing at the opposite faces to prevent axial slipping of the enlargement with respect to the cord.

7. A cord lock according to claim 6 where the pulley holder includes downwardly depending arms defining said slot means for passage therethrough of the cord, said arms being spaced apart such that passage therethrough of the cord enlargements is prevented.

8. A cord lock according to claim 6 for locking the cord in combination with said article hook, said hook having a generally planar C-shape terminating in operative position in vertically spaced apart upper and lower C-end portions, said lower C-end portion being adapted for hanging said article thereon and having lateral or spiral curvature outward to one side of said planar shape allowing lateral spacing therebetween sufficient to accommodate placement of the article onto and removal from said side of the hook.

9. An article suspension system according to claim 6, where the pulley holder is swivel mounted in a pulley bracket.

10. An article suspension system according to claim 6, where the pulley holder includes anti-snag flanges closely adjacent to the pulley wheel ends such as to keep the cord centrally spaced from said wheel ends.

11. A cord lock according to claim 6 where the cord comprises an enlargement at each position point thereof corresponding to the respective position at which the article is to be held in static suspension.

12. A cord lock according to claim 11 adapted for locking at a display or monitoring position.

13. A cord lock according to claim 11 adapted for locking at a maintenance position.

14. In an article suspension system, a locking handle for raising, lowering and suspending an article at selected positions of static and dynamic suspension, said system including a supporting pulley wheel, a first or article hook having a C-shape terminating in operative article suspending position in vertically spaced apart upper and lower C-end hook portions, said lower C-end hook portion being adapted for hanging an article thereon, and a cord joining and extending between said first hook and the locking handle and being adapted to be hung in a first position of static suspension over the top of the pulley wheel with a first cord section reaching therebelow to the first hook and with a second cord section reaching therebelow is suspension to the handle by means of which handle an article in suspended hooking relation from the lower C-end hook portion of said first hook can be raised and lowered with respect to the pulley wheel, said handle having a central body portion and further having in operative locking position a unitary lower C-end handle hook portion comprising a second hook attached in hooking relation with the upper C-end hook portion of said first hook such that the article is in static suspension from said mutually joined first and second hooks.

15. A handle according to claim 14 including opposed concave edges in the body portion configured in a reel shape adapted for reeling and storage of existing slack in the length of the suspension cord.

16. A handle according to claim 14 having opposed matching lower and upper C-end portions comprising second and third hooks that are functionally interchangeable in hooking relation with the upper C-end portion of the first hook.

17. A handle according to claim 16, having a body portion configured in a reel shape with front and rear faces for reeling and storage of existing slack in the length of the suspension cord, a portion of the cord being thus reeled and the cord run from the front face of the reel being taken around to the back face of the handle and then placed axially onto the front face of the third or handle centering hook, thereby minimizing entanglement of the lines at the front face and confining the two respective upward cord runs to the axial line of the handle.

18. In an article suspension system a cord enlargement for suspending an article on a cord in a selected position of static suspension, said system including a hook, a pulley wheel, a pulley holder having a cord lock, and a cord joining and extending between the hook and said cord enlargement, the cord lock comprising arms spaced apart to define a slot having a width accommodating free passage of the cord length therethrough, the cord enlargement having a dimension greater than the slot width and being located at a point in the length of the cord corresponding to said selected position such that the enlargement can be reeled in or paid out over the pulley wheel with the article being correspondingly raised or lowered in dynamic suspension to said selected position in which said enlargement is placed in anchoring registry with said cord lock arms thereby anchoring and holding the cord in static suspension at said position, the cord enlargement comprising a bead or button having opposite faces in mutually open communication through at least three axial channels that are threaded therethrough by the cord such that open snub-loops are formed at the respective opposite faces and the free ends are threaded through the respective snub-loops thus enabling snubbing of the cord at the opposite faces sufficient to prevent axial slipping of the bead or button with respect to the cord and thereby further enabling locking of the cord enlargement against the cord slot arm.

* * * * *